Oct. 14, 1952     E. C. RITTER     2,613,957
CONNECTING MEANS FOR PARALLEL TUBES

Filed Jan. 29, 1952     3 Sheets-Sheet 1

INVENTOR
EMIL C. RITTER,
BY
Irving Seidman
ATTORNEY

Oct. 14, 1952     E. C. RITTER     2,613,957
CONNECTING MEANS FOR PARALLEL TUBES
Filed Jan. 29, 1952     3 Sheets-Sheet 2
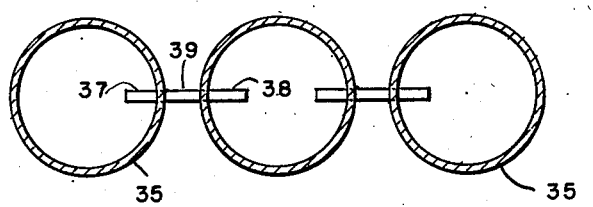
FIG. 8.
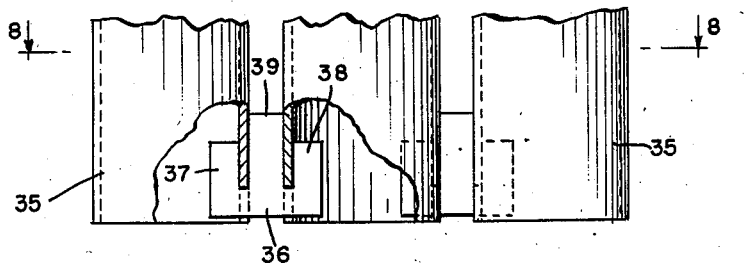
FIG. 9.
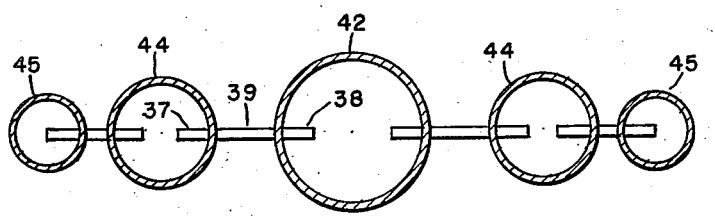
FIG. 10.
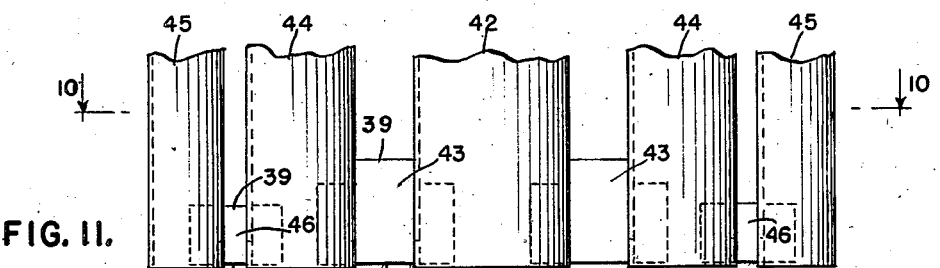
FIG. 11.
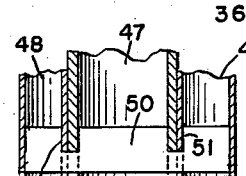
FIG. 13.
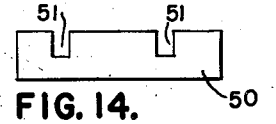
FIG. 14.
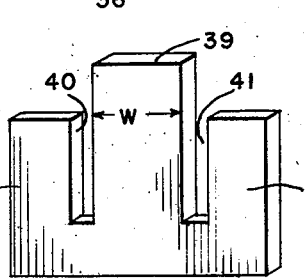
FIG. 12.
FIG. 15.
INVENTOR
EMIL C. RITTER,
BY
Irving Seidman
ATTORNEY Oct. 14, 1952         E. C. RITTER         2,613,957
CONNECTING MEANS FOR PARALLEL TUBES
Filed Jan. 29, 1952         3 Sheets-Sheet 3
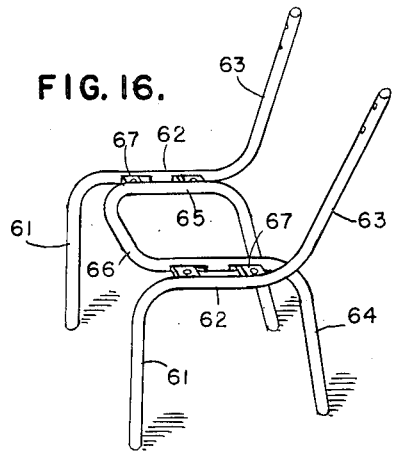
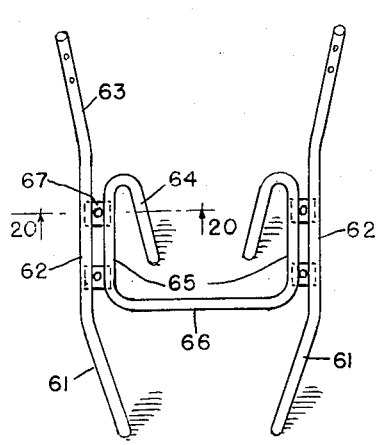
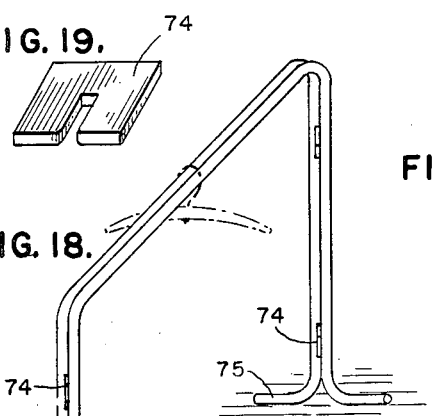
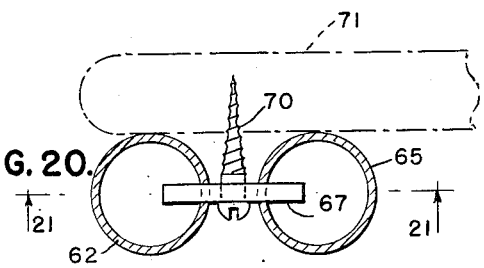
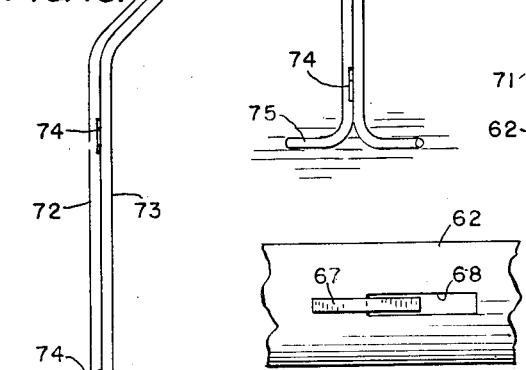
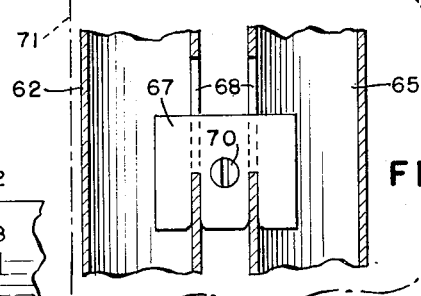
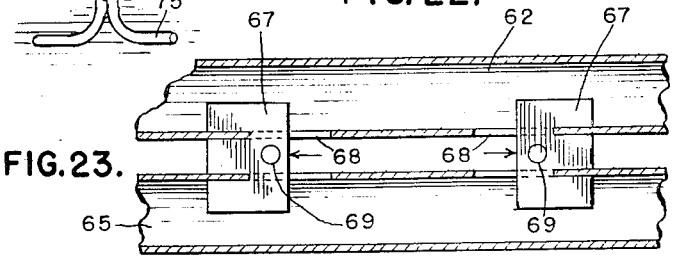
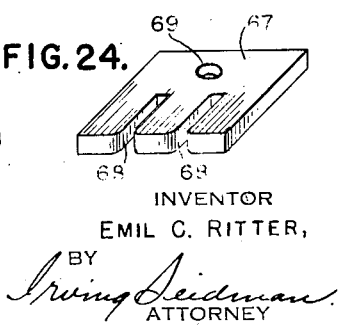
INVENTOR
EMIL C. RITTER,
BY
Irving Seidman
ATTORNEY Patented Oct. 14, 1952

2,613,957

UNITED STATES PATENT OFFICE 2,613,957

CONNECTING MEANS FOR PARALLEL TUBES

Emil C. Ritter, New York, N. Y., assignor to The R. G. D. Corporation, New York, N. Y., a corporation Application January 29, 1952, Serial No. 268,767

2 Claims. (Cl. 285—21)

This invention relates to a weldless means for connecting tubular members and is particularly applicable for the construction of supporting units or legs for tables, chairs and the like.

Heretofore, supporting units or legs usually comprised firmly connected tubular elements which, at the present time, are locked together by means of screws, bolts and nuts or are held together by spot welding same. The said supporting units as described are generally manufactured and assembled by one organization, after which they are packed in cartons and shipped to furniture manufacturers who attach them to table tops, chair seats and the like.

The upper half of some forms of the said tubular elements have arcuate formations, the free ends of which are attached to the furniture for which they are intended. The shape of assembled supporting members is necessarily bulky and comparatively few of them can be packed into shipping cartons, thereby making cartons of considerable volume or bulk resulting in an exceedingly high cost for shipping.

In order to overcome these objections, this invention considers forming two or more tubular members having slots formed thereon and securing the said tubular members at their adjacent sides by means of a binder member engageable in the said slots and against the walls of the tubular members.

Supporting units constructed in accordance with the principle of this invention may be disassembled or knocked down and compactly packed in cartons, each carton holding many times the number of complete supporting units than is possible with the assembled supporting units now being manufactured and shipped as above set forth.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

The invention itself, however, both as to its organization and its method of operation, will best be understood from the following description of a specific embodiment when read in connection with the accompanying drawings, in which:

Fig. 8 is a sectional plan view taken along the line 8—8 of Fig. 9 and shows a modified form of binder member;

Fig. 9 is an elevational view of the lower part of tubular members showing the use of a modified binder member and has parts broken away;

Fig. 10 is a sectional plan view taken along line 10—10 of Fig. 11 and shows a series of tubular units of different diameters connected to form a single unit;

Fig. 11 is an elevational view of the lower part of tubular members of different diameters and spaced apart at different distances;

Fig. 12 is a perspective view of a binder member adapted for use with tubular members arranged and connected as shown in Figs. 8 to 11 inclusive;

Fig. 13 is a fragmentary sectional detail view showing three tubular members of different diameters joined and held together by a modified binder member;

Fig. 14 is a view of the binder member;

Fig. 15 is a fragmentary sectional detail view of still another combination of tubular members of different diameters, two of which are spaced apart;

Fig. 16 is a perspective view of a chair frame embodying a modified form of this invention;

Fig. 17 is a perspective view of same looking down upon the front of the chair frame;

Fig. 18 is a perspective view of a clothes rack embodying the features of this invention;

Fig. 19 is a perspective detail of binder member applied to the forms shown in Figs. 16, 17 and 18;

Fig. 20 is an enlarged detail taken along line 20—20 of Fig. 17;

Fig. 21 is a fragmentary detail taken along line 21—21 of Fig. 20;

Fig. 22 is a fragmentary detail showing a wall of a tubular member;

Fig. 23 is a longitudinal fragmentary section showing two binder members in position and connected to two tubular members; and Fig. 24 is a perspective view of a form of binder member.

Figure 2:
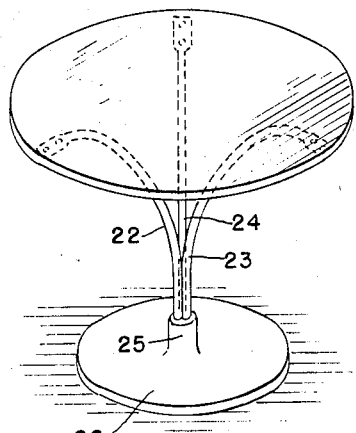
Fig. 2 is a perspective view of a circular table top with the improved supporting units attached but showing a different arrangement of same.
Figure 3:
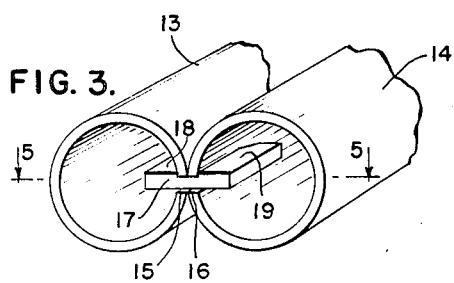
Fig. 3 is an enlarged detail, in perspective, and shows the lower end of a supporting unit and the means employed for connecting and holding two tubular members together.
Figure 4:
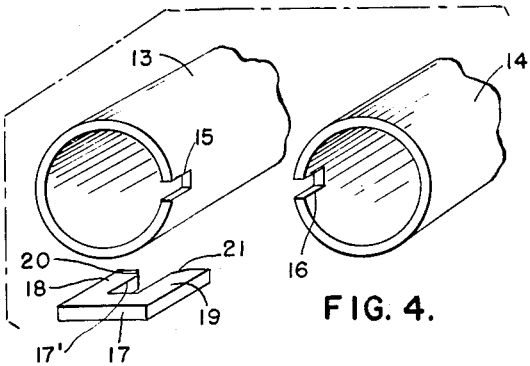
Fig. 4 is a similar perspective view but shows the parts exploded or drawn apart.
Figure 5:
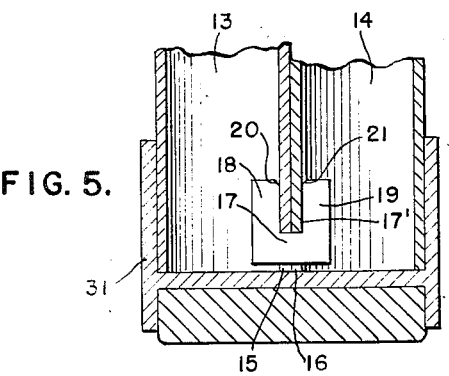
Fig. 5 is a vertical sectional view taken along a plane indicated by the line 5—5 of Fig. 3 and looking in the direction indicated by the arrows.

Referring now in detail to the drawings in which similar reference numerals refer to like parts throughout, 11 designates, generally, a table having supporting units 12 which units are each made up of two connected tubular members 13 and 14. The lower ends of the tubular members 13 and 14 are provided with similar slots 15 and 16 respectively into each pair of which a U-shaped binder 17 is adapted to engage. The said U-shaped binder 17 is formed with legs 18 and 19 which extend beyond the said slots 15 and 16 and contact tightly against the inner surface of walls of the tubular members 13 and 14 respectively as best shown in Figs. 3 and 5. The inner edges of the legs 18 and 19 are slightly tapered at their ends, as shown at 20 and 21 respectively. The walls of the slot 17' formed by the legs 18 and 19 of the binder 17, fit snugly or tightly against the walls of the tubular members and may be driven into place by tapping upon the outer edge of the binder. The upper arcuate ends of the tubular members 13 and 14 which form the supporting unit 12 diverging from each other as best shown in Fig. 2 and each terminates in a flattened portion having screw orifices to afford a means for attaching the supporting unit to a table top. The flat formations are best shown by the dotted lines of Fig. 2.

Figure 6:
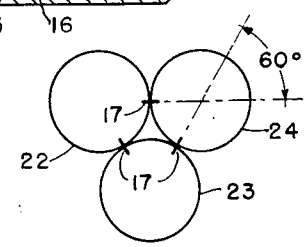
Fig. 6 is a diagram, in plan, showing the manner of connecting three tubular members.

In Fig. 2 a supporting unit is shown comprising three tubular units 22, 23 and 24 (see also Fig. 6). The lower ends of the said three tubular units engage in a pocket formed in a pedestal 25 in turn upstanding upon a base plate 26. In this form the slots in the tubular members must be arranged and spaced at angles of 60°.

Figure 7:
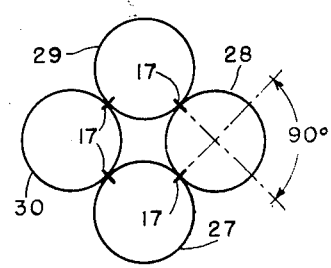
Fig. 7 is a diagram, in plan, showing four connected tubular members.

In Fig. 7 the diagram shows how four tubular members 27, 28, 29 and 30 may be secured to form a four tube supporting member. In this form the base 26 may be employed and upon the arcuate spread of the upper portions of the tubular members there may be supported a table top in a manner similar to that shown in Fig. 2. This form requires the slots to be arranged at angles of 90°. Tubular members, having circular cross-sections have so far been described. However, various other cross-sectioned types may be employed and embody the connecting means herein described.

Figure 1:
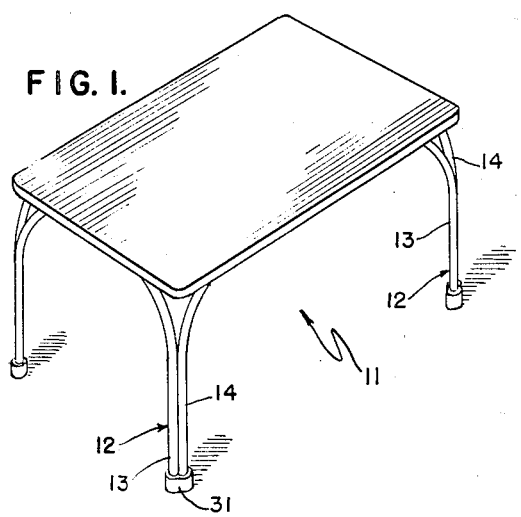
Fig. 1 is a perspective view of a rectangular table with the improved supporting units attached thereto.

A cup-shaped footing 31 conforming to the cross-sectional outline of the tubular members may be employed as shown in Figs. 1 and 5.

The form shown in Figs. 8 and 9 indicates a plurality of tubular members 35 which are spaced apart by employing a binder member 36 which is formed with legs 37 and 38 and a central inwardly projecting spacer and separator 39. The width "W" of the said spacer 39 may be varied to conform to the various spacings between the tubular members 35. The heights of spacer 39 may also be varied. The thickness of walls of the tubes may be varied and the width of the slots 40 and 41, in the binder member 36 should, in such case, be varied accordingly. Such slots must be slightly smaller in width than the combined thickness of the tube or tubes or approximately .004 inch less than the thickness of a single tube or the combined thickness of two adjoining tubes (Fig. 5) so that when the binder member, when driven in with a hammer, will spread slightly and firmly grip the tube or tubes.

Figs. 10 and 11 show a combination of tubes of various sizes and variously spaced. In Fig. 11 the spacer members 39 are shown of different heights solely for aesthetic purposes. The central tube 42 shown in Figs. 10 and 11 is of a large diameter with a wide spacer 43 between it and two other tubes 44 of a smaller diameter adjacent each side and a still smaller tube 45 with a smaller spacer 46 joining the smallest tubes 45 to the tubes 44.

Fig. 13 shows three tubes 47, 48 and 49 of different diameters and having walls of varying thickness. A binder member 50 having slots 51 (Fig. 14) of a width conforming to the combined thickness of the abutting walls of the tube 47 with tubes 48 and 49. Fig. 15 shows two pairs of contacting tubes 52, 53 and 54, 55, all of different diameters and of different wall thickness. The said two pairs of tubes are spaced apart and are connected by means of a binder member 56 formed with a spacer 57.

In Figs. 16 and 17 there is shown another adaptation of this invention. The said figures depict a chair frame made up of tubular members in which 61 designates the front legs, side seat support 62 and back support 63. A U-shaped tubular member is bent to form the rear legs 64, the side seat support 65 and the front seat support or cross-bar 66. The two sections of the frame are joined by binder members 67 (see Figs. 16, 17, 20 to 24 inclusive), which are adapted to engage within slots 68 formed in the tube sections at the said side seat supports 62 and 65. The said slots are long enough to allow the entrance of the binder member 67 which is formed with open ended slots 68 which engage over one end of the said slots 68 and may be pressed in either direction to engage the wall of the tubular sections 62 and 65. In Fig. 23 two binder members 67 are shown which are moved outwardly in the direction shown by the arrows. An orifice or screw hole 69 is formed in the binder member 67 through which a screw 70 is passed to engage the seat 71 (dot-dash line in Fig. 20). Obviously, the binder members 67 may be moved in the slots 68 in a direction to that shown by the said arrows in Fig. 23.

Fig. 18 shows still another application of this invention. In this form a clothes rack is indicated and consists of two inverted U-shaped tubular members 72 and 73 which are joined by binder members 74 (Figs. 18 and 19) and have flared-out foot portions 75.

It is obvious that various changes and modifications may be made in the details of construction and arrangement of parts without departing from the general spirit of the invention.

I claim:

1. A supporting leg structure for articles of furniture comprising tubular members having confronting side wall portions disposed in contacting engagement with the other and formed with longitudinal slots opposite each other, said slots extending inwardly from the outer ends of said tubular members, and a substantially U-shaped binder formed of stiff metal having its bridge portion passing through the slots and fitting in tight engagement with the walls of the slots, the arms of said U-shaped binder extending longitudinally in the tubular members beyond the inner ends of the slots, the space between the arms of the U-shaped binder being slightly less than the combined thickness of the contacting wall portions of the tubular members whereby the arms tightly grip said wall portions when the binder is applied, the slots in the tubular members having a depth at least equal to the depth of the bridge portion of the U-shaped binder.

2. A supporting leg structure for articles of furniture comprising tubular members having confronting side wall portions disposed in contacting engagement with the other and formed with longitudinal slots opposite each other, said slots extending inwardly from the outer ends of said tubular members, and a substantially U-shaped binder formed of stiff metal having its bridge portion passing through the slots and fitting in tight engagement with the walls of the slots, the arms of said U-shaped binder extending longitudinally in the tubular members beyond the inner ends of the slots, the space between the arms of the U-shaped binder being slightly less than the combined thickness of the contacting wall portions of the tubular members whereby the arms tightly grip said wall portions when the binder is applied, the slots in the tubular members being of a depth greater than the depth of the bridge portion of the U-shaped binder so that when the parts are assembled, the outer edge face of the bridge portion will be disposed inwardly of the outer open ends of the tubular members.

EMIL C. RITTER.

REFERENCES CITED

The following references are of record in the file of this patent:

UNITED STATES PATENTS

| Number | Name | Date |
| --- | --- | --- |
| 1,002,859 | McFarlane | Sept. 12, 1911 |
| 1,162,147 | Dunlap | Nov. 30, 1915 |
| 1,678,392 | Hursh et al. | July 24, 1928 |
| 2,375,409 | Glitsch | May 8, 1945 |
| 2,562,022 | Duer | July 24, 1951 |
| 2,580,334 | Vanderveld | Dec. 25, 1951 |